United States Patent [19]

Babel et al.

[11] Patent Number: 4,780,952
[45] Date of Patent: Nov. 1, 1988

[54] TOOL CARRIAGE FOR LOADING MACHINE TOOLS

[75] Inventors: Werner Babel, Achweg; Walter Schwarz, Auf der Herze, both of Fed. Rep. of Germany

[73] Assignee: MAHO Aktiengesellschaft, Fed. Rep. of Germany

[21] Appl. No.: 20,453

[22] Filed: Mar. 2, 1987

[30] Foreign Application Priority Data

Mar. 6, 1986 [DE] Fed. Rep. of Germany ....... 3607391

[51] Int. Cl.⁴ ............................................. B23Q 3/157
[52] U.S. Cl. ........................................ 29/568; 211/1.5
[58] Field of Search ............... 29/568, 563, 564, 33 P; 211/1.5; 414/736

[56] References Cited

U.S. PATENT DOCUMENTS

| | | | |
|---|---|---|---|
| 3,576,540 | 4/1971 | Fair et al. | 29/568 X |
| 3,781,974 | 1/1974 | Hölzl et al. | 29/568 |
| 4,240,194 | 12/1980 | Inami et al. | 29/568 |
| 4,547,955 | 10/1985 | Shiomi et al. | 29/568 |
| 4,590,662 | 5/1986 | Norota | 29/568 |
| 4,608,747 | 9/1986 | Link et al. | 29/568 |
| 4,637,120 | 1/1987 | Geiger | 29/568 |

FOREIGN PATENT DOCUMENTS

| | | | |
|---|---|---|---|
| 288112 | 2/1971 | Austria | 29/568 |
| 3327512 | 2/1984 | Fed. Rep. of Germany | 29/568 |
| 3331293 | 3/1984 | Fed. Rep. of Germany | 29/568 |
| 3521844 | 1/1987 | Fed. Rep. of Germany | 29/564 |
| 160038 | 9/1983 | Japan | 29/568 |

*Primary Examiner*—William R. Briggs
*Attorney, Agent, or Firm*—Baker, Maxham & Jester

[57] ABSTRACT

A tool carriage for automatically loading tools into and unloading tools from tool magazines of numerically controlled tools. A tool changing assembly is mounted for two-dimensional movement with respect to a slide member which is movable in two dimensions with respect to the supporting structure of the carriage. The tool changing assembly has gripping arms on a carrier rotatably mounted to a saddle, the arms being adapted to move tools between a tool supply magazine on the carriage and the machine tool magazine.

7 Claims, 1 Drawing Sheet

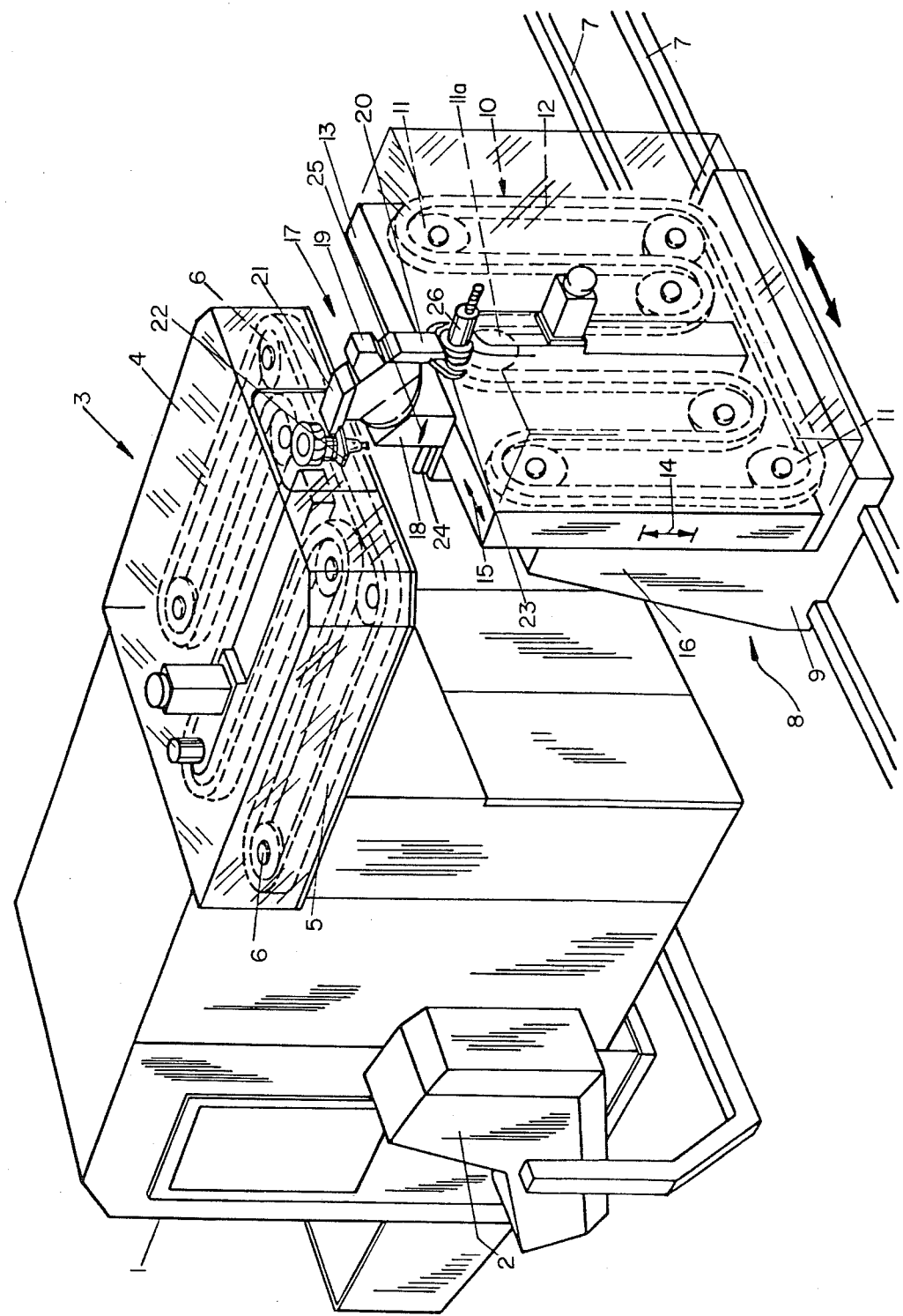

TOOL CARRIAGE FOR LOADING MACHINE TOOLS

FIELD OF THE INVENTION

The invention is directed to a tool carriage for loading machine tool magazines of program controlled machine tools. This invention is especially useful with machining centers integrated in a flexible production system. The carriage comprises a multi-track undercarriage including a numerically controlled (NC) travelling mechanism and a vertical supporting structure, and a tool supply magazine mounted in upright orientation on the plate-like supporting structure and is separately driven. A tool changing assembly including movable gripping arms provides for transferring a selected tool from the tool supply magazine to the tool magazine of the machine tool, and vice versa.

BACKGROUND OF THE INVENTION

In conventional NC machine tools and machining centers the tools are normally inserted by hand into the machine's magazines and are manually changed, respectively. When plural machine tools are to be successively loaded with fresh tools, wheel barrows may be used on which the respective tools are placed in an ordered array. This procedure of loading tools into the magazines of plural machine tools is cumbersome and time consuming, because all important operations must be effected manually.

German patent publication No. 3,331,293 discloses a tool changing system for a machine tool with a main tool magazine, in which a tool carriage comprises a track-bound multi-track undercarriage and mounted thereon a plate-like supporting structure. A disk magazine is mounted on said supporting structure for rotation about a horizontal axis, said disk magazine containing a multiplicity of tool cartridges each including plural tools. The column of each machine tool includes a tool changing assembly which has the function of transferring the individual cartridges from the disk magazine of the tool carriage into the machine's own disk magazine.

With this known system there exist difficulties relating to the exact positioning of the individual tool cartridges in the changing position, because the disk magazine of the tool carriage, which forms a tool store, can only be rotated about its central shaft but cannot be accurately positioned as to its height or lateral position. The arrangement of the various tool changing assemblies on the respective machine tools requires relatively high technical effort and additional space.

Further tool loading systems for program controlled machine tools are known, for instance, from Austrian Pat. No. 288,112 and German patent publication No. 3,327,512.

SUMMARY OF THE INVENTION

It is an object of the invention to automate the loading of tool magazines of NC machine tools of different types in such a way that the various operations can be performed without excess efforts of design and control engineering by program control.

In accordance with the invention, the above-specified object is solved in that a slide is mounted on plate-like supporting structure for motor-driven horizontal and vertical movement of the carriage. The slide carries the tool supply magazine on its vertically extending outer surface and the tool changing assembly on its horizontally extending top. The tool changing assembly comprises a saddle mounted for horizontal and transverse movement on the slide and an angle carrier adapted to be rotatable about an angle axis and having two diametrically opposed gripping arms.

The tool carriage can travel either on rails or, when being part of a flexible floor conveying system, under control of induction loops mounted in the floor, with the aid of its own travelling mechanism, into exactly determined positions behind or beside the respective machine tool. Optical sensors or limit switches, or both, as well as separate positioning means, can accurately orient the respective carriage in the prescribed changing position and can secure it against random movement. By the program controlled actuation of the tool supply magazine a certain tool is moved to the defined changing position in the gripping area of the tool changing assembly, whereupon the tool changing assembly is extended until its gripping members pull the tool from the tool supply magazine. After a rotation about 180°, during a retracting movement, the tool is inserted into an empty tapered hole of the machine tool's own tool magazine.

To enable the carriage to successively travel to different types of machine tools and to load the same with tools, a suitable further improvement of the invention provides that the tool supply magazine and the tool changing assembly are mounted on a slide which is disposed on the undercarriage of the tool carriage for displacement along at least one axis.

Different types of tool supply magazines can be mounted either on the slide or even directly on the undercarriage of the tool carriage. Accordingly, it may be suitable also to design the tool changing assembly itself to be motor-driven along at least one axis relative to the undercarriage or the slide, respectively. Such a movable tool changing assembly is able not only to receive certain tools from the established changing position of the magazine but also from other positions.

The employment of a chain magazine, as it is called, is especially suitable, the endless chain of such magazine being trained in a plurality of loops on a sidewall of the slide, which is an upright plate, about a corresponding number of chain wheels. Although chain magazines are relatively expensive, they offer the advantage of being capable of accommodating a very large number of tools in a relatively small space. Moreover, their drive mechanism is simple and accurate. But instead of the chain magazines it is also possible to use so-called disk magazines, which are less expensive but permit only a smaller number of tapered holes for tools in a predetermined space.

BRIEF DESCRIPTION OF THE DRAWING

The objects, features and advantages of this invention will be more readily perceived from the following detailed description when read in conjunction with the accompanying drawing, the single figure of which is a partial phantom isometric view of a machining center with the tool carriage constructed according to the invention.

DESCRIPTION OF THE PREFERRED EMBODIMENT

The drawing illustrates a machining center for the machining of workpieces by milling, drilling and turning in a forward working region which is covered by protective hood 1. The machining center may be connected to a programmable central control unit and may include program control unit 2 of its own. In the upper rear portion of the machining center chain magazine 3 running through five loops is provided in protective hood 4. Endless chain 5 of the machine tool magazine is trained about a total of seven chain wheels 6 and possesses a multiplicity of conventional tapered holes (not illustrated in the drawing) into which certain tools are inserted, for example, with ISO tapers.

At a predetermined distance from the rear of the machine or the chain magazine, respectively, tracks 7 are mounted on which the transport carriage 8 of the invention travels. This transport carriage 8 comprises beneath a metal protection hood 9 an undercarriage and a drive assembly (not illustrated in detail) adapted to be remote-controlled, for example, by induction loops mounted in the floor or by radio. For accurately positioning and locking carriage 8 in the illustrated changing position, separate drive means such as endless chains provided with hooks, advancing cylinders or the like may be mounted either in or on the floor for engagement with certain catches on the carriage that has automatically travelled into their field of action so as to move the carriage accurately to the illustrated changing position.

The illustrated tool carriage is provided with tool supply magazine 10 in the form of a five-loop chain magazine, endless chain 12 of which is trained about a total of seven chain wheels 11 of which at least one (11a) is a driven wheel. The shafts of chain wheels 11 are mounted on the vertical side face of slide 13 which is guided for movement in the direction of double arrow 14 in the vertical direction and possibly also in the direction of double arrow 15 along the forward (as seen in the drawing) vertical face of rigid supporting structure 16.

Centrally on slide 13, which is in the form of an upright plate, tool changing mechanism 17 is arranged including saddle 18 in which angle carrier 19 is mounted which has two gripping arms 20, 21 at right angles to each other and a respective gripping member 22, 23 provided on each gripping arm end. Saddle 18 is guided by guide means 24 for movement transversely to the longitudinal sides of slide 13 in the direction of double arrow 25 by a drive mechanism (not illustrated). Angle carrier 19 with gripping arms 20, 21 mounted thereon is respectively rotatable by 180° about an angled axis which extends perpendicularly to the inclined end face of saddle 18. Gripping arms 20, 21 as well as gripping member 22, 23 are configured such that upon a rotational movement of angle carrier 19 and also during the revolving motions of chain 12 of magazine 10 and chain 5 of magazine 3 the various structural components will not collide. To this end the gripping members have a very wide opening area and are capable of being pivoted backward by a large amount.

Control means (not illustrated) including respective sensors and limit switches are connected to the central program control such that the drive means for the various movable components may be actuated via the central control unit in accordance with predetermined programs. For instance, when tool 26 in the upper central changing position is to be changed, that is, placed in the machine tool magazine, the respective actuator for gripping member 23 is operated, the gripping member by its closing movement engaging about the tapered shank of the tool. By a displacing movement of the saddle in the direction of outwardly directed arrow 25 tool 26 is pulled out of the respective tapered hole of chain 12. Thereupon angle carrier 19 is rotated about 180° so that gripping arm 20 with gripping member 23 and tool 26 retained thereby will then be in a position pivoted about 180°, which is occupied in the drawing by gripping arm 21 and gripping member 22. Thereupon the angle carrier 19 is again retracted into the saddle 18 which subsequently travels along the guide means 24 while being driven by its drive mechanism along the arrow 25 directed toward the machine. Due to this movement tool 26, which is then located directly in front of a desired tapered hole, is pushed into the hole. Following opening of the gripping member chain magazine 3 may be advanced until a tool to be changed is in the changing position. The changing operation for this tool, that is, pulling this tool from chain magazine 3 and inserting it into magazine 10, will then take place in the manner described above.

A particular advantage of the above-described embodiment resides in that both chain magazine 10 and slide 13 are of the same design as chain magazine 3 of the machine tool so that without major resetting operations such a chain magazine may also be employed as tool magazine on a transport carriage.

The invention is not limited to the embodiment described above. Instead of a chain magazine it is also possible to mount a disk magazine with a drive mechanism of its own on supporting structure 16 or on other suitable supporting frames of the tool carriage. Moreover, other types of magazines such as paternosters having two revolving endless chains and carriers mounted therebetween with a series of taper holes for tools are likewise possible. Further, the tool magazine need not be horizontal and the tool supply magazine may be oriented in some direction other than vertical. They need not be arranged at 90° with respect to each other.

What is claimed is:

1. A tool carriage for loading the tool magazines of numerically controlled machine tools, said tool carriage comprising:

a traveling mechanism having a supporting structure mounted to an undercarriage, said traveling mechanism being arranged with respect to the machine tools to travel to and have predetermined tool changing positions in close proximity thereto;

a slide member mounted to said supporting structure for two-dimensional movement with respect thereto;

a tool supply magazine mounted to said slide member, said tool supply magazine being adapted to removably receive a plurality of machine tools in a plurality of separate openings, said openings being movable in concert with respect to said slide members; and a tool changing assembly comprising:

a saddle slidably mounted to said slide member for reciprocating movement with respect thereto in a direction transverse to the dimensions of movement of said slide member;

an angle carrier rotatably mounted to said saddle;

at least one gripping arm on said angle carrier, said gripping arm having a proximal end secured to said angle carrier and a distal end extending therefrom; and a gripping member on said distal end of said gripping arm;

said gripping member being adapted to grasp a tool in either said tool supply magazine or said tool magazine and, pursuant to the reciprocal movement of said saddle and rotational movement of said angle carrier, the tool is removed from one of said magazine is transported to the other said magazine.

2. The tool carriage recited in claim 1, wherein said tool supply magazine comprises an endless chain having holes therein for receiving a plurality of tools, said chain being driven by a chain wheel.

3. The tool carriage recited in claim 2, wherein said chain is disposed on one wall of said slide member in a plurality of loops around a plurality of chain wheels, a predetermined one of said chain wheels defining a tool changing position.

4. The tool carriage recited in claim 1, wherein said tool supply magazine is configured as a paternoster comprising two synchronously driven lateral endless chains having attached thereto a plurality of transverse members formed with openings for receiving tools.

5. The tool carriage recited in claim 1, wherein said tool supply magazine is configured in the form of a disk formed with a plurality of openings for receiving tools.

6. The tool carriage recited in claim 1, wherein when in the tool changing position, said tool magazine and said tool supply magazine are in juxtaposition arranged at right angles with respect to each other.

7. The tool carriage recited in claim 1, wherein said angle carrier has two oppositely disposed gripping arms thereon, each having a gripping member, whereby a tool may be transferred from each magazine to the other by 180° rotation of said angle carrier.

* * * * *